(12) United States Patent
Ritzinger et al.

(10) Patent No.: US 8,764,095 B2
(45) Date of Patent: Jul. 1, 2014

(54) FOLDING TOP WITH REAR-WINDOW LINK

(71) Applicant: Webasto-Edscha Cabrio GmbH, Stockdorf (DE)

(72) Inventors: Peter Ritzinger, Eging am See (DE); Armin Anzinger, Postmuenster (DE)

(73) Assignee: Webasto-Edscha Cabrio GmbH (DE)

( * ) Notice: Subject to any disclaimer, the term of this patent is extended or adjusted under 35 U.S.C. 154(b) by 0 days.

(21) Appl. No.: 13/958,025

(22) Filed: Aug. 2, 2013

(65) Prior Publication Data
US 2014/0042770 A1 Feb. 13, 2014

(30) Foreign Application Priority Data
Aug. 9, 2012 (DE) .................. 10 2012 107 314

(51) Int. Cl.
*B60J 1/18* (2006.01)
*B60J 7/12* (2006.01)
(52) U.S. Cl.
USPC ................. 296/107.07; 296/107.09
(58) Field of Classification Search
CPC .............................. B60J 1/1823; B60J 1/1815
USPC ............................ 296/107.07, 107.09, 107.15
See application file for complete search history.

(56) References Cited

U.S. PATENT DOCUMENTS

| | | | | |
|---|---|---|---|---|
| 3,346,297 | A * | 10/1967 | Colautti et al. | 296/146.14 |
| 5,443,296 | A * | 8/1995 | Just et al. | 296/107.09 |
| 6,283,532 | B1 * | 9/2001 | Neubrand | 296/107.07 |
| 6,729,673 | B2 * | 5/2004 | Hahn | 296/107.12 |
| 7,392,873 | B2 * | 7/2008 | Habacker | 180/69.2 |
| 7,806,459 | B2 * | 10/2010 | Weismuller et al. | 296/107.08 |
| 2002/0030380 | A1 * | 3/2002 | Rothe et al. | 296/107.07 |
| 2006/0125282 | A1 * | 6/2006 | Theuerkauf | 296/107.07 |
| 2008/0061585 | A1 * | 3/2008 | Beierl et al. | 296/107.07 |
| 2010/0259066 | A1 * | 10/2010 | Haberl et al. | 296/108 |
| 2011/0227364 | A1 * | 9/2011 | Neubrand et al. | 296/108 |

FOREIGN PATENT DOCUMENTS

| | | | |
|---|---|---|---|
| DE | 102006042286 A1 | | 3/2008 |
| DE | 102007021490 A1 | * | 11/2008 |
| DE | 202011101127 U1 | | 7/2011 |

* cited by examiner

*Primary Examiner* — Jason S Morrow
(74) *Attorney, Agent, or Firm* — Quarles & Brady LLP

(57) ABSTRACT

A folding top of a cabriolet vehicle, comprising a foldable top lining which can be adjusted by a top linkage between a closed position, in which it covers a vehicle interior, and a stowed position, in which it opens up the vehicle interior in the upward direction, the top linkage having, at both sides of a vertical top longitudinal central plane, in each case one link arrangement which comprises a rear-window link to which there is articulatedly connected a rigid rear window which is bordered by the top lining. The rear-window links are articulatedly connected in each case via a first joint to an intermediate link which is articulatedly connected via a second joint to a base element. The rear-window links, in the closed position, are supported in each case on the respectively associated intermediate link via a rear-window link stop.

6 Claims, 4 Drawing Sheets

FOLDING TOP WITH REAR-WINDOW LINK

BACKGROUND OF THE INVENTION

1. Field of the Invention

The invention relates to a folding top of a cabriolet vehicle having a foldable top lining which can be adjusted between closed and stowed positions.

2. Related Technology

A folding top of said type is known from practice and constitutes an adjustable roof of a motor vehicle designed as a cabriolet. The known folding top comprises a foldable top lining which can be adjusted by a top linkage between a closed position, in which it covers a vehicle interior, and a stowed position, in which it opens up the vehicle interior in an upward direction. In the stowed position, the top lining is arranged together with the top linkage in a rear-end top stowage compartment. In its closed position, the top lining is secured, via a front hoop assigned to the top linkage, to a front cowl of the respective vehicle, which front cowl borders a windshield at the upper edge thereof.

Furthermore, the top linkage of the known folding top comprises, at both sides of a vertical top longitudinal central plane, in each case one link arrangement with a rear-window link to which there is articulatedly connected a rigid rear window which extends in a vehicle transverse direction. The rear window is normally bordered by the top lining. The rear-window link is articulatedly connected via a single rotary joint to a base element which may be a bow link of the top linkage or else the main bearing thereof. During the adjustment of the top linkage, the rear window thus always moves relative to the base element on a circular path, such that the rear window is also stowed in a constrained position in the top stowage compartment.

It is alternatively known for rear windows to be articulatedly connected to a top linkage via a four-bar mechanism. This involves high costs and also takes up a large amount of installation space. Furthermore, with said articulated connection technique, the rear window is also stowed in a constrained position in the top stowage compartment, which can result in stresses within the top structure.

SUMMARY OF THE INVENTION

The invention provides a folding top of the type described above which exhibits improved rear-window stowage characteristics.

According to the invention, a folding top of a cabriolet vehicle comprises a foldable top lining which can be adjusted by a top linkage between a closed position, in which the top lining covers a vehicle interior, and a stowed position, in which the top lining opens up the vehicle interior in an upward direction, the top linkage having, at both sides of a vertical top longitudinal central plane, in each case one link arrangement which comprises a rear-window link to which there is articulatedly connected a rigid rear window which is bordered by the top lining, wherein the rear-window links are articulatedly connected in each case via a first joint to an intermediate link which is articulatedly connected via a second joint to a base element, and the rear-window links, in the closed position, are supported in each case on the respectively associated intermediate link via a rear-window link stop.

Thus, according to the invention, the rear-window link in the form of the intermediate link is assigned a lever owing to which, during an adjustment of the top linkage, the rear window does not perform a simple rotational movement about the articulation point of the rear-window link but rather, owing to pulling movements which are exerted on the rear window by the top lining and which may be oriented in the direction of the rear or else in the direction of the vehicle front end, is always held in a position which does not introduce any possibly damaging stresses into the top lining. By means of the intermediate links, it is rather possible for constrained positions of the rear window to be avoided, such that a jerky adjustment of the rear window, that is to say the "catching" thereof, can be prevented. In the stowed position of the top linkage, the rear window is stowed without stresses, because it can float rearwardly in the vehicle longitudinal direction by a pivoting of the intermediate link. The combination of the rear-window link with the intermediate link, which may also be regarded as a two-part rear-window link arrangement, saves on material, costs, and installation space.

The rear-window links, in the closed position, are supported in each case on the respectively associated intermediate link via a rear-window link stop. In this way, it is prevented that the intermediate link and the rear-window link perform a pivoting movement relative to one another in an undesired manner, because in general, a torque oriented in the direction of the rear-window link stop is introduced into the rear-window link by the top lining.

To prevent that the intermediate links perform an undesired, possibly functionally disruptive pivoting movement during the adjustment of the top linkage, it is provided in one expedient embodiment of the folding top according to the invention that the intermediate links are supported in each case on the respective base element via an intermediate link stop.

The base element may be any desired structural element of the top linkage whose arrangement is suitable for the mounting of the rear window via the rear-window links. In one specific embodiment of the folding top according to the invention, however, the base elements are formed in each case by a bow link of the top linkage. In particular, a corner bow of the top linkage may be connected to the bow links, which corner bow, in a closed position of the top, is arranged in a rear-end corner region of the top and defines the transition between a substantially horizontally arranged roof region and a sloping rear region which also comprises the rear window. It is also conceivable for the base elements to be formed in each case by a main bearing of the top linkage.

Further advantages and advantageous refinements of the subject matter of the invention will emerge from the description, from the drawings, and from the patent claims.

BRIEF DESCRIPTION OF THE DRAWINGS

An exemplary embodiment of a folding top according to the invention is illustrated in schematically simplified form in the drawings and will be explained in more detail in the following description. In the drawings.

DETAILED DESCRIPTION

Figure 4:
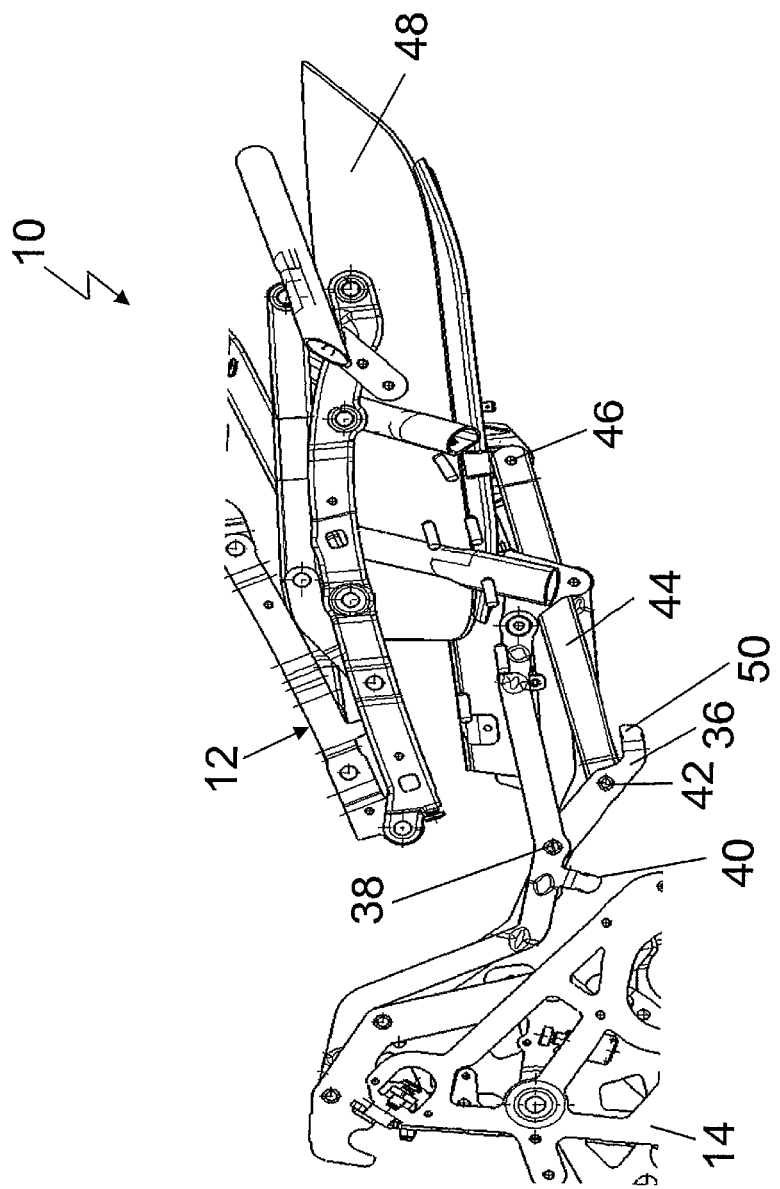
FIG. 4 shows the top linkage in a stowed position.

The drawings illustrate a rear region of a top linkage 10 by means of which a foldable top lining which is fixed to the top linkage 10 can be adjusted between a closed position, in which it stretches over a vehicle interior, and a stowed position, in which it opens up the vehicle interior in the upward direction. In the stowed position, which is illustrated in FIG. 4, the top lining (not illustrated in any more detail) is stowed together with the top linkage 10 in a rear-end top stowage compartment of the respective motor vehicle.

The top linkage 10 comprises, at both sides of a vertical vehicle longitudinal central plane, in each case one link arrangement 12 which is pivotably mounted on a main bearing 14 arranged in the region of the top stowage compartment. The link arrangements 12 have in each case a main link 16 and a main pillar 18 which are connected via corresponding joints to links 20 which are arranged toward the front end in relation to said main link and main pillar and which extend in the vehicle direction.

Transverse bows 22, 24, and 26 extend between the link arrangements 12 arranged at both sides, of which transverse bows the transverse bow 26 constitutes a so-called corner bow which defines a rear-end roof edge at which the top, in its closed position, exhibits a transition from a substantially horizontally oriented portion to a sloping portion which leads to a tensioning hoop 28 which rests on a rear-end vehicle body section.

The corner bow 26 has a kinematic drive mechanism which comprises two corner bow links 30 and 32 which are articulatedly connected to the main bearing 14 and of which the link 30 is driven by means of a drive link 34 which is articulatedly connected to the main pillar 18.

Figure 1:
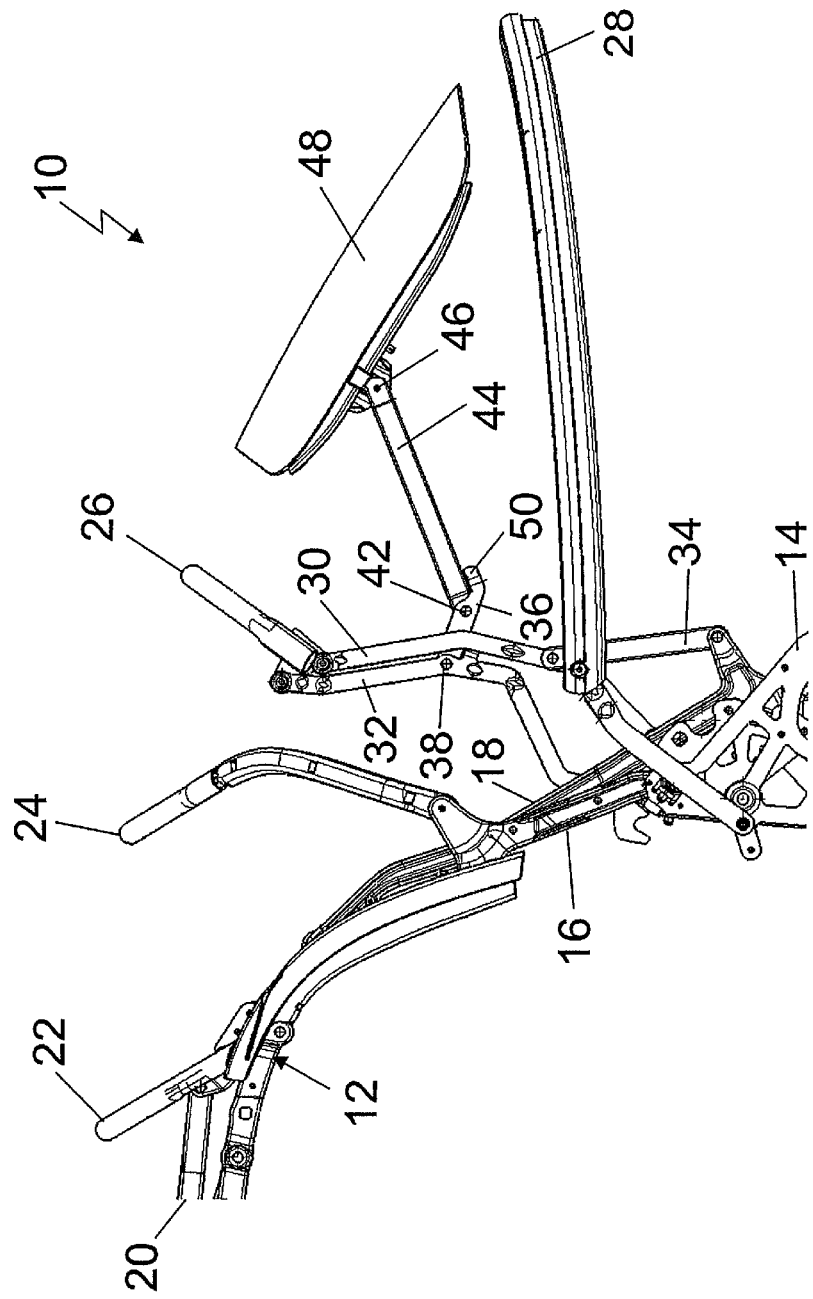
FIG. 1 shows a partial side view of a top linkage of a folding top according to the invention in its closed position.
Figure 2:
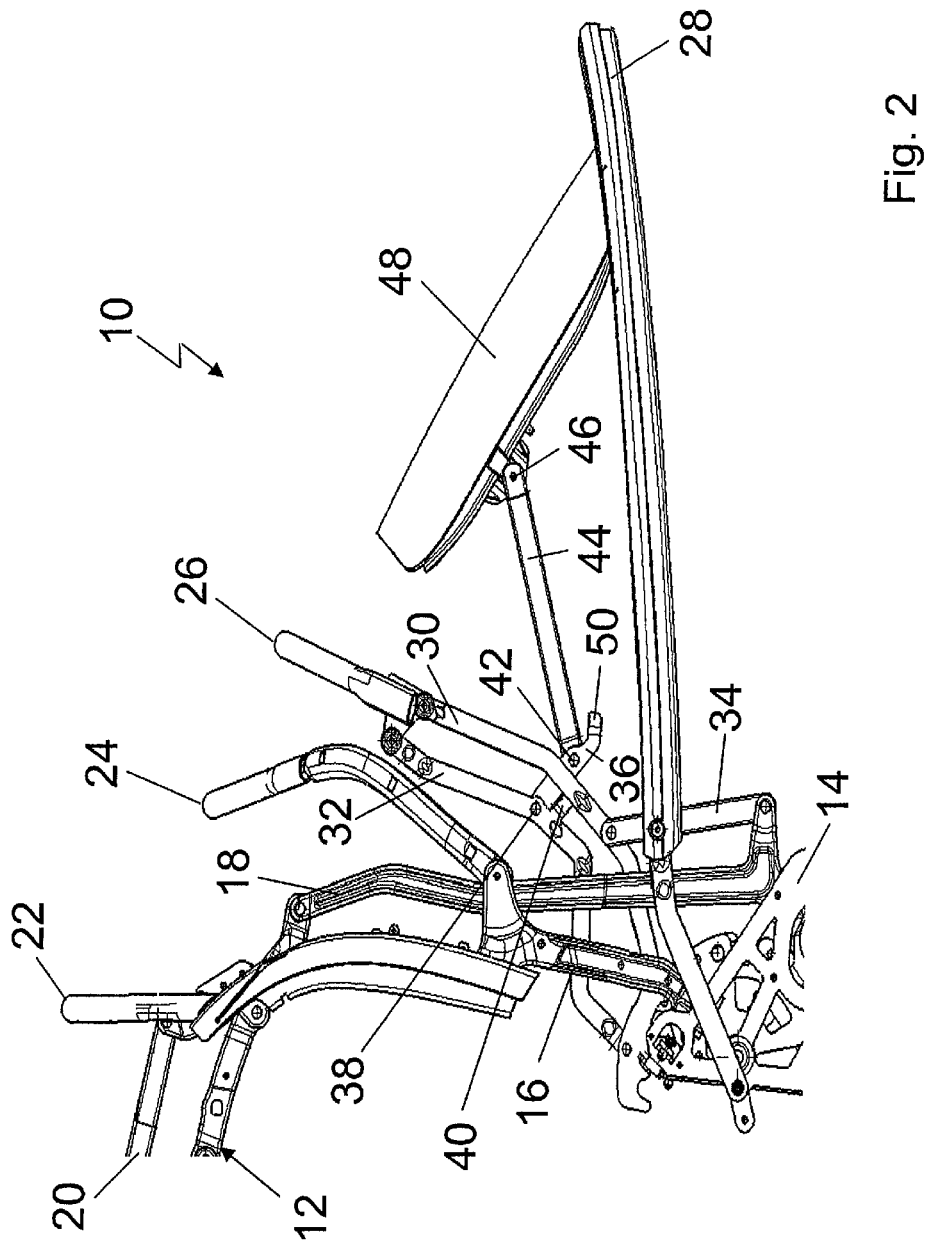
FIG. 2 shows an illustration corresponding to FIG. 1 of the top linkage, but in a first opening phase.
Figure 3:
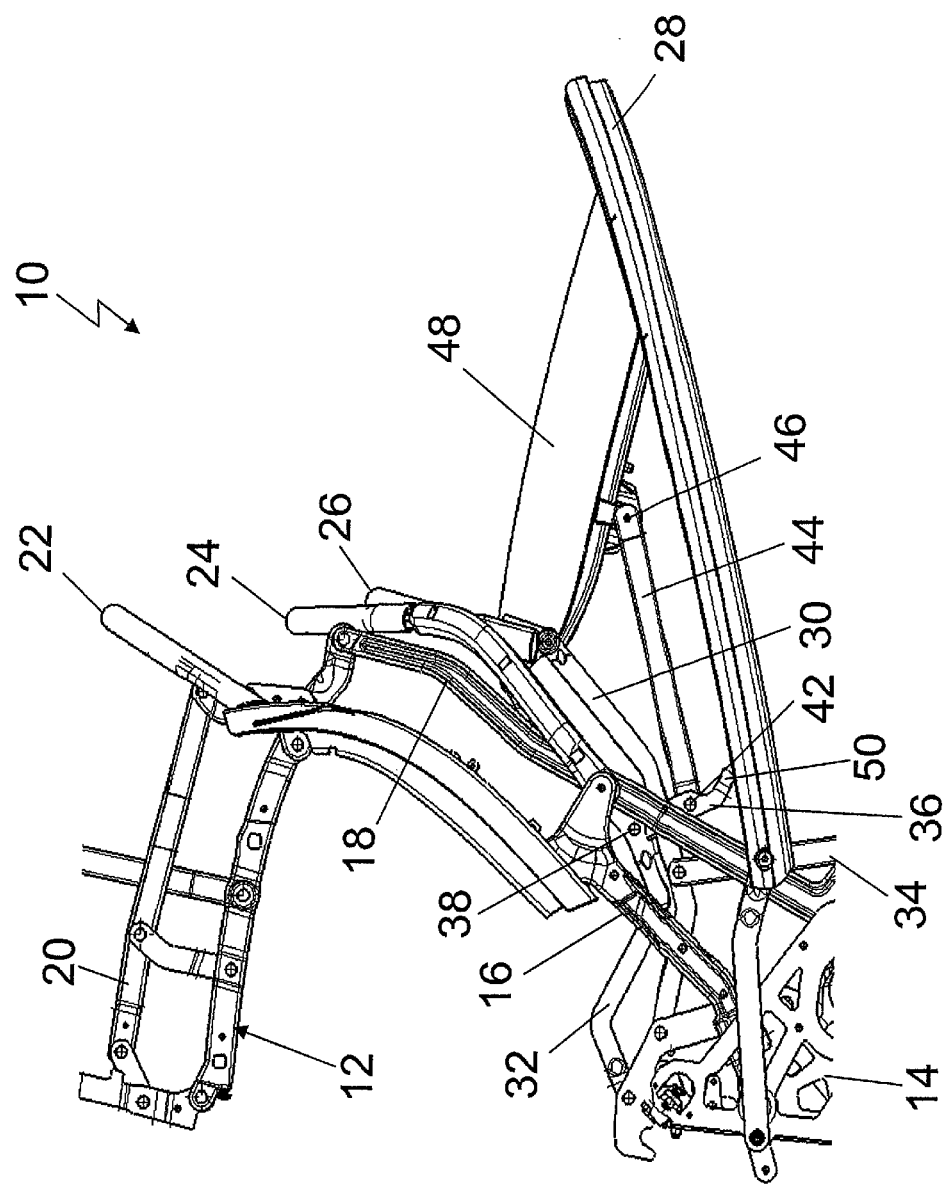
FIG. 3 likewise shows an illustration corresponding to FIG. 1, but in a second opening phase.

Articulatedly connected to the corner bow link 32 via a joint point 38 is a rocker lever or intermediate link 36 which points in the direction of the rear and which, in the closed position illustrated in FIG. 1, rests on an intermediate link stop 40 which is formed in the manner of a projection on the corner bow link 32.

In a distal portion of the intermediate link 36 in relation to the joint point 38, a rear-window link 44 is articulatedly connected to said intermediate link via a further joint point 42, which rear-window link, at its end facing away from the intermediate link 36, is articulatedly connected via a joint point 46 to a rear window 48 extending in the vehicle transverse direction, which rear window is bordered at its edges by the top lining (not illustrated in any more detail).

In the closed position illustrated in FIG. 1, the rear-window link 44 is supported on a rear-window link stop 50 which is formed on the intermediate link 36 as a bent portion or projection.

The above-described articulated connection of the rear window 48 to the top linkage 10 operates in the manner described below.

Proceeding from the closed position illustrated in FIG. 1, in which the top lining is arranged stretched out over the vehicle interior and exerts load on the rear window 48 such that the intermediate link 36 rests on the intermediate link stop 40 and the rear-window link 44 rests on the rear-window link stop 50, the top linkage 10 is pivoted in the direction of the rear of the vehicle. Here, the rear window 48 exerts a force on the intermediate link 36 via the rear-window link 44 which has now been pivoted away from the rear-window link stop 50, said force being such that said intermediate link continues to bear against the intermediate link stop 40. Only in an end phase during the opening of the folding top does the force exerted by the rear window 48 on the intermediate link 36 decrease, such that said intermediate link, as can be seen from FIG. 4, is pivoted away from the intermediate link stop 40 in the direction of the rear of the vehicle.

During the pivoting of the top linkage 10, the corner bow link 30, the intermediate link 36 and the rear-window link 44 always assume a relative position with respect to one another which minimizes the stresses induced in the top lining 40, such that a continuous movement profile without undesired catching is also ensured with regard to the movement of the rear window 48.

LIST OF REFERENCE NUMERALS

10 Top linkage
12 Link arrangement
14 Main bearing
16 Main link
18 Main pillar
20 Link
22 Transverse bow
24 Transverse bow
26 Transverse bow
28 Tensioning hoop
30 Corner bow link
32 Corner bow link
34 Drive link
36 Intermediate link
38 Joint point
40 Intermediate link stop
42 Joint point
44 Rear-window link
46 Joint point
48 Rear window
50 Rear-window link stop

The invention claimed is:

1. A folding top of a cabriolet vehicle, comprising a foldable top lining which can be adjusted by a top linkage between a closed position, in which the top lining covers a vehicle interior, and a stowed position, in which the top lining opens up the vehicle interior in an upward direction, the top linkage having, at both sides of a vertical top longitudinal central plane, in each case one link arrangement which comprises a rear-window link to which there is articulatedly connected a rigid rear window which is bordered by the top lining, wherein the rear-window links are articulatedly connected in each case via a first joint to an intermediate link which is articulatedly connected via a second joint to a base element, and the rear-window links, in the closed position, are supported in each case on the respectively associated intermediate link via a rear-window link stop.

2. The folding top as claimed in claim 1, wherein the intermediate links, in the closed position, are supported in each case on the respective base element via an intermediate link stop.

3. The folding top as claimed in claim 1, wherein the base elements form in each case one bow link of the top linkage.

4. The folding top as claimed in claim 3, wherein a corner bow of the top linkage is connected to the bow links.

5. The folding top as claimed in claim 2, wherein the base elements form in each case one bow link of the top linkage.

6. The folding top as claimed in claim 5, wherein a corner bow of the top linkage is connected to the bow links.

\* \* \* \* \*